G. W. Stout,
Ironing Hats.

No. 109,072.

4 Sheets, Sheet 1.

Patented Nov. 8, 1870.

Witnesses.

Inventor,
G. W. Stout
by his atty
J. S. Stetson

G. W. Stout,
Ironing Hats.

No. 109,072.  Patented Nov. 8, 1870.

Witnesses  Inventor,
G. W. Stout

4 Sheets, Sheet 3.
G. W. Stout,
Ironing Hats.
No. 109,072.  Patented Nov. 8, 1870.
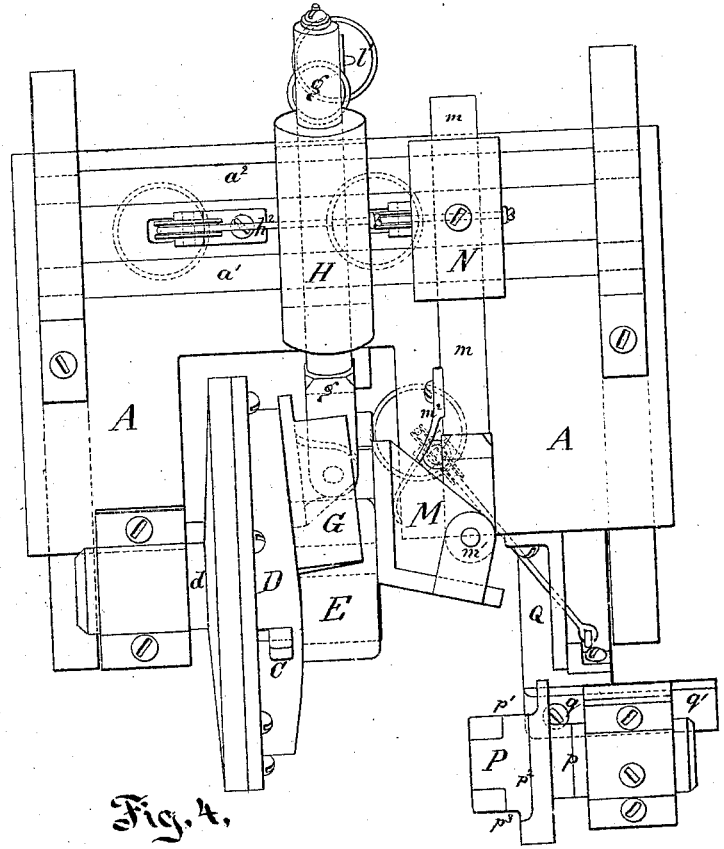
Fig. 4.
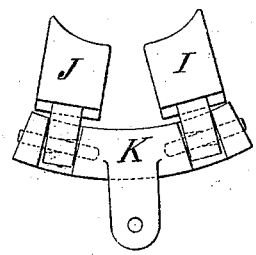
Fig. 5.
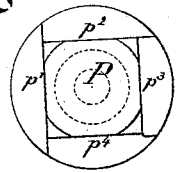
Witnesses,
Inventor, G. W. Stout,
Ironing Hats.

No. 109072.   Patented Nov. 8, 1870

4 Sheets, Sheet 4.

Witnesses,                    Inventor,

United States Patent Office.

GEORGE W. STOUT, OF NEWARK, NEW JERSEY, ASSIGNOR TO NEW YORK HAT-FINISHING COMPANY.

Letters Patent No. 109,072, dated November 8, 1870.

IMPROVEMENT IN HAT-FINISHING MACHINES.

The Schedule referred to in these Letters Patent and making part of the same.

*To all whom it may concern:*

Be it known that I, GEORGE W. STOUT, of Newark, in the county of Essex and State of New Jersey, have invented certain new and and useful Improvements in Hat-Finishing Machines; and I do hereby declare that the following is a full and exact description thereof.

My invention relates to the same class of machines described in the patent to myself and John C. Richardson, dated December 15, 1868. The general construction and operation of many of the parts corresponds with that described in that patent, and will be only briefly described here.

My present invention relates to a modification of the form of the brim-plate, new constructions and arrangements of the irons to allow therefor, and to generally increase the efficiency and perfection of the operation, and to means for confining and releasing the hat-block.

I will first describe what I consider the best means of carrying out my invention, and will afterward designate the points which I believe to be new therein.

The accompanying drawing forms a part of this specification.

Figure 3, a plan view of the same.

Figure 4 shows the side-irons I J, and their connections to the carrier K.

Figure 5 is a view of the iron P, in the direction of its axis $p$, to show the different faces $p^1$ $p^2$ $p^3$ $p^4$.

Figure 1:
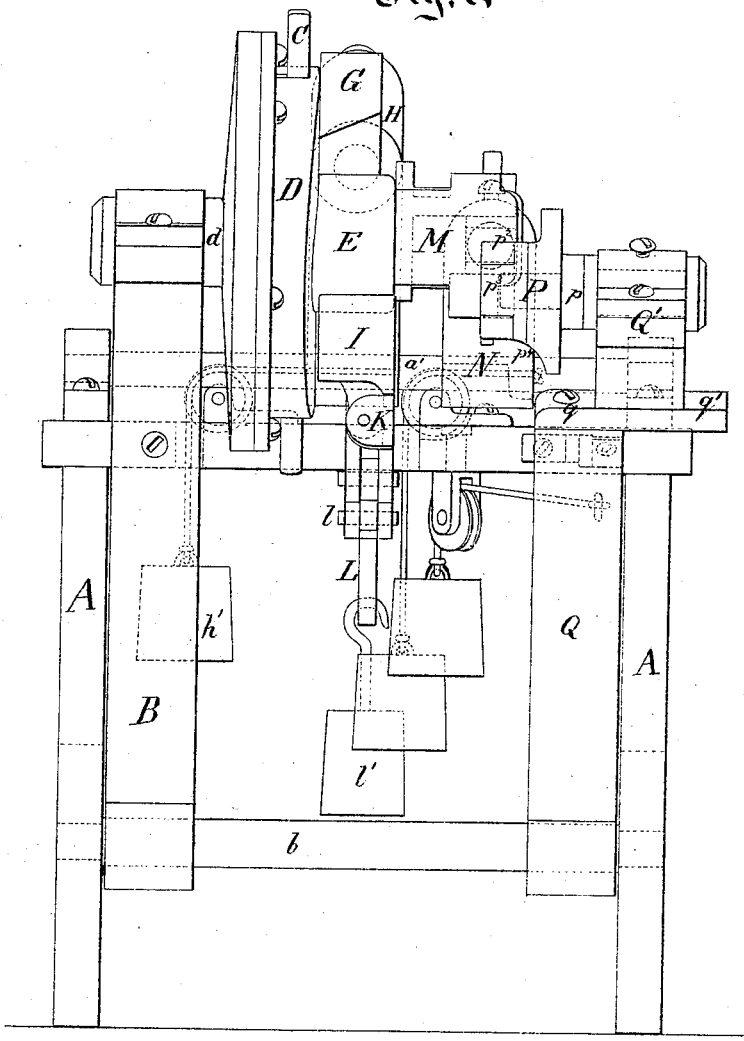
Figure 1 is a front elevation of my improved machine.
Figure 2:
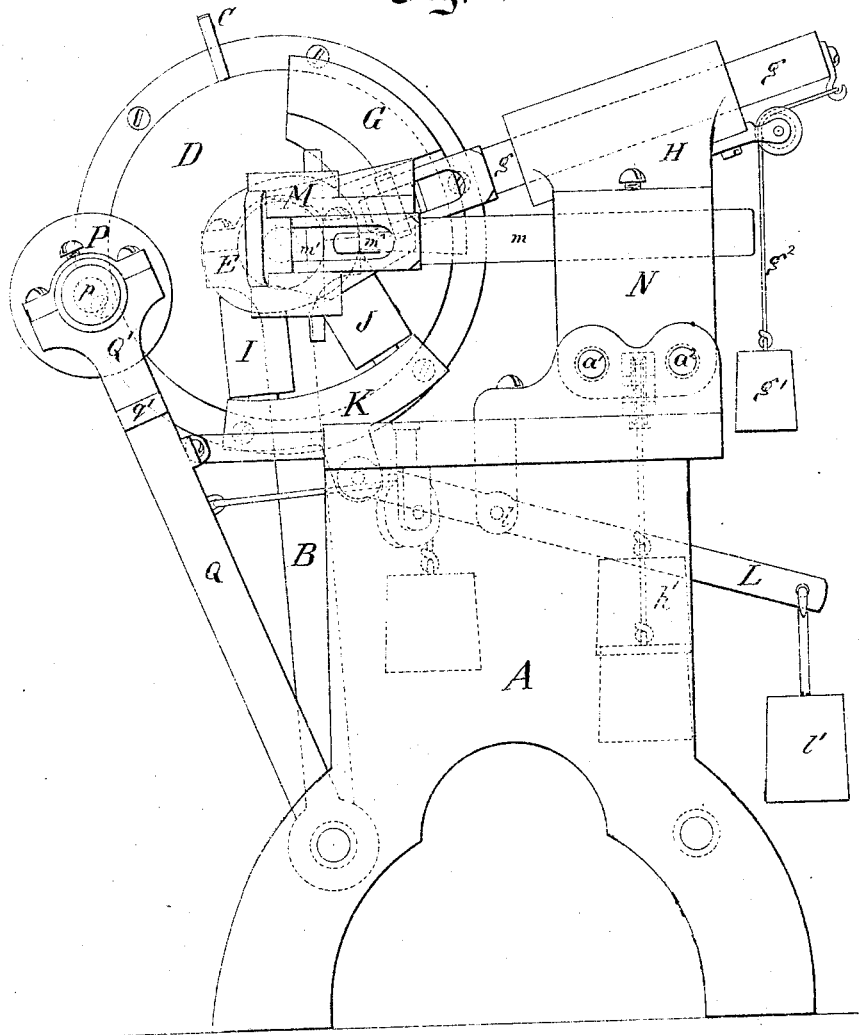
Figure 2 is a side elevation.
Figure 6:
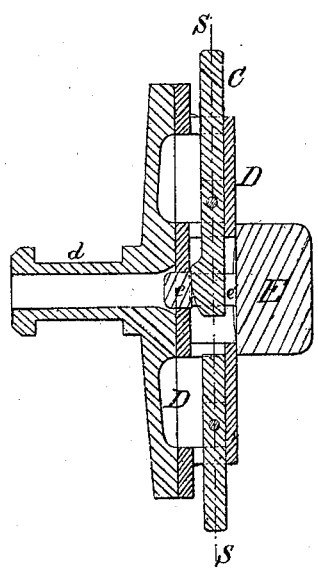
Figure 7:
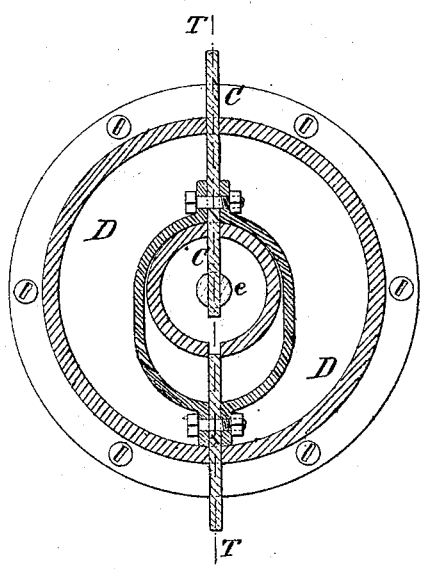

Figure 6 is a central section through the curved brim-plate D and hat-block E, on the line T T in fig. 7.

Figure 7 is a cross-section through the brim-plate on the line S S in fig. 6. These two figures show in detail the connection of the hat-block E to the curved brim-plate D, by means of the key C.

Figure 8:
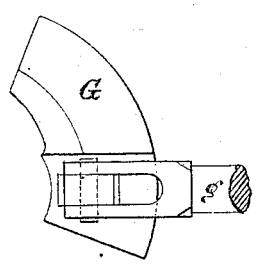

Figure 8 is a side elevation of the brim-iron G, and part of the shaft $g$ to which it is attached.

Figure 9:
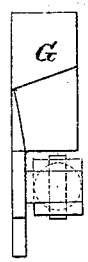

Figure 9 is a front elevation of the same.

The drawing represents the novel parts, with so much of the previously known parts as is necessary to indicate their relations thereto.

Similar letters of reference indicate like parts in all the figures.

A is the fixed frame-work.

B is a stout arm turning on a shaft, $b$, and carrying bearings in which the shaft $d$ of the brim-plate D is free to revolve.

Suitable pulleys and belts, not represented, being provided for giving motion to this brim-plate in the manner described in the aforesaid patent of December 15, 1868, the brim-plate D, with the hat-block and hat carried thereon, is revolved slowly or rapidly in either direction, and is, in one position of the arm B, subjected to the action of the irons, and is afterward swung away out of contact with the irons, to be revolved at a different velocity in the same or a different direction, and to allow the hat-block and hat to be removed and exchanged.

Instead of a plain brim-plate, as described in our former patent, I employ one which is curved, to adapt it to match to a curved-brim hat.

Fashions vary at different periods, and in different localities. There is often required some styles of hats with perfectly plain brims, but the majority require to be curved so as to drop at the front and rear, and rise at the sides.

As this class of machines has been heretofore used, the hats were finished with plain brims, and the brims were afterward bent to the curvature desired. This obviously involves a distortion of the work which my invention is intended to avoid.

My improved machine finishes the hats with the brims curved to an extent approximating that in which they are to be finally finished. One degree of curvature of the brim-plate in my finishing-machine, may serve for a variety of degrees of curvature in the finished hat, but it always approximates to that of the finished hat, and thus reduces the degree of subsequent distortion or re-shaping which is required.

E is the hat-block. It may vary in height, in diameter and in roundness of its corners. It may, in fact, be made with a perfectly angular corner, where the top or tip joins the side-crown. In all cases, it will be understood that the irons must be adapted thereto.

I provide one iron which is especially provided to iron the angle where the tip joins the side-crown. That I will particularly describe below.

I will avoid using the technical and unusual terms as far as possible.

The band or line where the side-crown is joined to the brim, as also the top of the brim, is treated by the iron G.

The side-crown is treated by the irons I J, and the tip is treated by the iron M, while the angle between the tip and side-crown, and, of course, a portion of the surfaces of both these parts, is or may be treated by the iron P.

The iron P is of special importance in treating those hats where the junction of the tip and the side-crown is rounded.

The arcs of such curvature are liable to vary very greatly with changes in the sizes and styles of hats. I have provided a single iron, P, with several different faces $p^1$ $p^2$ $p^3$ $p^4$, each having different degrees of curvature.

A very important function of this iron is to treat not only the angle, whether rounded or acute, but also a considerable portion of the surface of the side-crown and tip. I can use these irons with success on hats having perfectly sharp angles.

In either case, I make the sides $p^1\ p^2\ p^3\ p^4$ to vary in depth, so that I can, by turning the iron P about in its bearing on the arm Q, and thus presenting different faces, as, for example, the face $p^2$ instead of the face $p^1$, iron hats having a taller or a flatter crown, and iron with this iron nearly or quite the whole depth of the side-crown.

I propose in practice to provide a number of changeable irons P, each having four or some other number of faces, which may be made available in succession. This seems necessary, to provide for the infinite variations of the depths and of the curvatures of the surfaces to be treated. But the number of separate irons is much less than would be required if the irons were of the ordinary character, and not changeable by turning around, as in my invention.

The shaft $p$ of the iron P is carried in a bearing-piece, $Q^1$, which swivels on an axis, $q$, on the main arm Q. When in use it is turned on the axis $q$ by the hand of the attendant applied to the projecting portion or handle $q^1$, so as to iron smoothly a curved angle, or those parts of the tip or side crown adjacent to the curve or angle when the iron does not fit with mathamatical exactness thereto.

The arm Q, with the parts attached thereon, is capable of turning in the vertical plane, and also of sliding longitudinally on the shaft $b$. These motions allow it to be brought into action and removed out of the way as the work requires.

Any convenient means may be employed for clamping or confining the shaft $p$ in its bearing-piece Q, so that the iron shall not turn except when it is desired to change the face.

The entire arm Q and its connections may be drawn upward into the line of the axis of the hat-block by means of a weight and cord, not represented.

My brim-plate D and all the several irons may be heated by steam or by gas, according to any ordinary or suitable plan. I prefer heating by jets of gas, under all ordinary circumstances, where gas is available.

The curvature of the brim-plate D induces some difficulties in the working of the irons, which it is the object of another part of my invention to provide for. The irons are adapted to accommodate themselves to all the motions required. These motions may be briefly recited:

The hat-block is usually oval, which involves retreating and advancing motions of the irons from and toward the axis of motion of the hat-block. Then the brim-plate being curved involves a necessity, first, for an oscillating motion of the iron G, which irons the brim; and, second, of a movement of the entire iron G bodily in a direction parallel to the axis of the hat-block.

I provide for all this, first, by mounting the brim-iron G on a shaft, $g$, which is free to slide longitudinally to and from the axis of motion of the hat-block E, under the influence of a weight, $g^1$, and cord, $g^2$. This shaft $g$ is also capable of oscillating in its bearings, which allows the connected brim-iron G to perform the necessary oscillating movement to adapt itself to the changing angle presented by the curved brim.

The bearing of the shaft $g$, in which these oscillating and sliding motions are performed, is in the carrier H, which is capable of moving on the fixed guides $a^1$ $a^2$ under the influence of the weight $h^1$ and cord $h^2$.

It being understood that the cords $g^2$ and $h^2$ run over pulleys which turn with very little friction, it will be seen that the brim-iron G is pressed upon the brim with a force which is nearly constant in all positions, and depends on the gravity of the weight $h^1$, while it is pressed inward toward the axis of the hat-block E, and, consequently, irons the band portion of the side crown with a force which is nearly equal in all positions, and depends on the gravity of the weight $g^2$.

The side-crown irons I and J may be more briefly described.

They are two entirely distinct irons, heated by separate means, and applying on different portions of the surface of the side crown. They should be hollowed so as to match approximately to the surface of the side crown, and iron the same smoothly.

They are both mounted on the common carrier K, which is pressed up from below by means of the lever L, turning on the fulcrum $l$ under the influence of a weight, $l$.

There is a hinge or knuckle-joint at the junction of the lever L with the carrier K, and another at the junction of the latter with each of the irons I and J. These joints need not have liberty for very much motion. If much liberty is provided I esteem it well to provide springs, or other means not represented, for holding all the parts near the position shown, so that, when the lever L is tilted, and the irons are entirely out of contact with the hat, they will not very greatly change their position, but will be always in or near the position required for use.

The tip-iron M is mounted on a shaft, $m$, with a hinge-joint, $m^1$, which allows it to swivel, and its carrier N is also free to allow this iron to be moved to and from the work.

There may be a weight and cord, corresponding to that which actuates the carrier K, as is represented in the figures, and there may be any convenient provisions for allowing the shaft $m$ to slide longitudinally and to oscillate as before described; but in treating the tips of the common styles of the hats now in vogue it is not necessary to provide much motion for this iron.

I provide a spring, $m^2$, which may be bolted adjustably on the side of the shaft $m$, so as to press with any required degree of force on the tip-iron M. Its function is to press the tip-iron M fairly upon the surface to be smoothed, and to hold it fairly thereon under any slight variation in the positions in which the tip of the hat may be presented, whether such variations are intentional or are due simply to imperfections in the mechanism.

I have provided novel means for connecting and disconnecting the hat-block E.

Its center $e$ extends into the center of the brim-plate, and is mortised as indicated by $e^1$.

A cross-key, C, is mounted transversely in the brim-plate D, and is adapted to move endwise; that is to say, it can be moved to a limited extent transversely to the axis of motion of the curved brim-plate D. When driven in one direction by a blow, or by any other suitable means, it engages with the hat-block by taking in the recess or mortise $e^1$. By driving it tightly it holds the hat-block very rigidly on the brim-plate.

The ironing is effected in a few seconds, and then the brim-plate D and its connections having been swung out of contact with the irons, and its rotation arrested, one or more blows, driving the key C endwise in the direction opposite to that which causes it to engage, entirely releases the hat-block, while still leaving the key confined within the brim-plate.

This mode of connecting and disconnecting is peculiarly adapted to this machine, where the brim-plate is subjected to the peculiar motions, and the parts are hot and painful to handle.

Some of the benefits of my invention may be realized by using only a part thereof, but omitting the other parts, or employing ordinary parts as substitutes therefor; thus, for example, my curved brim-plate D and brim-iron G may be used without the mode of locking and releasing the hat-block, and *vice versa*.

I claim in hat-finishing machines—

1. The within-described method of ironing and finishing hats with curved brims, the brims being ironed by the yielding irons on the heated and curved brim-plate, revolved and operated substantially as herein set forth.

2. The rocking connection K and duplicate irons I J carried thereon, operated by the single lever or arm L, so as to allow the irons to change their positions relatively to each other, and conform to the varying positions and sizes of the hats, as herein specified.

3. The iron P, arranged and operating as specified.

4. The confined locking-key C, arranged and operating as represented relatively to the block E e and heated revolving brim-plate D, for the purposes herein set forth.

In testimony whereof, I have hereunto set my name in presence of two subscribing witnesses.

GEORGE W. STOUT.

Witnesses:
 WM. C. DEY,
 A. HOERMANN.